United States Patent
Chae et al.

(10) Patent No.: US 10,687,294 B2
(45) Date of Patent: Jun. 16, 2020

(54) METHOD AND APPARATUS FOR DEVICE-TO-DEVICE USER EQUIPMENT TO TRANSMIT SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 15/125,510

(22) PCT Filed: Mar. 13, 2015

(86) PCT No.: PCT/KR2015/002476
§ 371 (c)(1),
(2) Date: Sep. 12, 2016

(87) PCT Pub. No.: WO2015/137773
PCT Pub. Date: Sep. 17, 2015

(65) Prior Publication Data
US 2017/0078991 A1    Mar. 16, 2017

Related U.S. Application Data

(60) Provisional application No. 61/952,137, filed on Mar. 13, 2014, provisional application No. 62/108,501, filed on Jan. 27, 2015.

(51) Int. Cl.
*H04W 56/00* (2009.01)
*H04W 48/20* (2009.01)
(Continued)

(52) U.S. Cl.
CPC ............. *H04W 56/002* (2013.01); *H04L 5/14* (2013.01); *H04W 48/20* (2013.01); *H04W 76/14* (2018.02); *H04W 92/18* (2013.01)

(58) Field of Classification Search
CPC ... H04W 56/002; H04W 48/20; H04W 92/18; H04L 5/14
See application file for complete search history.

(56) References Cited

U.S. PATENT DOCUMENTS 9,768,711 B2 *   9/2017  Hameed .................. H02M 7/25
2009/0088160 A1 * 4/2009  Pani ....................... H04W 36/30
                                                              455/436

(Continued)

FOREIGN PATENT DOCUMENTS

CN    101471721 A    7/2009
CN    101682872 A    3/2010
(Continued)

OTHER PUBLICATIONS

Intel Corporation, Discussion on D2D transmission timing, Feb. 2014, 3GPP TSG RAN WG1, R1-140136, 6 pages (Year: 2014).*

(Continued)

*Primary Examiner* — Steven H Nguyen
(74) *Attorney, Agent, or Firm* — Birch, Stewart, Kolasch & Birch, LLP

(57) ABSTRACT

One embodiment of the present invention relates to a method for a user equipment to transmit a device-to-device (D2D) signal in a time division duplex (TDD) wireless communication system, the method comprising the steps of: generating a primary synchronization signal and a secondary synchronization signal; and transmitting a subframe in which the primary synchronization signal and the secondary synchronization signal are mapped, wherein, if the cell selection reception level value and the cell selection quality value of the user equipment are all greater than 0, then the (Continued)

user equipment applies a fixed timing advance offset value (e.g. 624 Ts) that is greater than 0 when transmitting the subframe.

11 Claims, 9 Drawing Sheets

(51) Int. Cl.
*H04L 5/14* (2006.01)
*H04W 76/14* (2018.01)
*H04W 92/18* (2009.01)

(56) References Cited

U.S. PATENT DOCUMENTS

| | | | | |
|---|---|---|---|---|
| 2011/0292915 | A1* | 12/2011 | Prakash | H04L 5/0064 370/336 |
| 2014/0112194 | A1* | 4/2014 | Novlan | H04W 8/005 370/254 |
| 2014/0335853 | A1* | 11/2014 | Sartori | H04W 56/0015 455/426.1 |
| 2015/0043451 | A1* | 2/2015 | Goto | H04W 72/0453 370/329 |
| 2015/0049663 | A1* | 2/2015 | Mukherjee | H04W 16/26 370/315 |
| 2015/0117309 | A1* | 4/2015 | Gage | H04W 8/005 370/328 |
| 2015/0117375 | A1* | 4/2015 | Sartori | H04W 56/001 370/329 |
| 2016/0095074 | A1* | 3/2016 | Park | H04W 8/005 370/350 |
| 2016/0142898 | A1* | 5/2016 | Poitau | H04W 76/14 370/329 |
| 2016/0165563 | A1* | 6/2016 | Jang | H04W 76/14 370/328 |
| 2016/0198289 | A1* | 7/2016 | Sorrentino | H04W 56/001 455/41.2 |
| 2016/0234801 | A1* | 8/2016 | Zhang | H04W 56/0005 |
| 2017/0289958 | A1* | 10/2017 | Dev | H04W 68/04 |

FOREIGN PATENT DOCUMENTS

| | | |
|---|---|---|
| CN | 102547881 A | 7/2012 |
| EP | 3119140 A1 | 1/2017 |
| JP | 2001-102988 A | 4/2001 |
| JP | 2010-525704 A | 7/2010 |
| WO | WO 2013/075340 A1 | 5/2013 |
| WO | WO 2013/122432 A1 | 8/2013 |
| WO | WO 2014/035805 A1 | 3/2014 |

OTHER PUBLICATIONS

3rd Generation Partnership Project, "Technical Specification Group Radio Access Network; Study on LTE Device to Device Proximity Services; Radio Aspects (Release 12)," 3GPP TR 36.843, V1.2.0, Feb. 2014, 49 pages, XP050769670.

3rd Generation Partnership Project, "Technical Specification Group Radio Access Network; User Equipment (UE) Procedures in Idle Mode and Procedures for Cell Reselection in Connected Mode (Release 9)," 3GPP TS 25.304, V9.0.0, Dec. 2009, pp. 1-20.

Ericsson, "Detection of Duplex," TSG-RAN WG1 #52, R1-080888, Sorrento, Italy, Feb. 11-15, 2008, pp. 2-4.

Huawei et al., "Definition of Coverage Zones for D2D Communication," 3GPP TSG RAN WG1 Meeting #76bis, R1-141141, Shenzhen, China, Mar. 31-Apr. 4, 2014, pp. 2-5.

Intel Corporation, "Discussion on D2D Transmission Timing," 3GPP TSG RAN WG1 Meeting #76, R1-140136, Prague, Czech Republic, Feb. 10-14, 2014, pp. 1-6.

LG Electronics, "D2D Discovery Signal Transmission Timing," 3GPP TSG RAN WG1 Meeting #76, R1-140339, Prague, Czech Republic, Feb. 10-14, 2014, pp. 1-11.

LG Electronics, "Discussion on D2D Signal Transmission and Reception Timing," 3GPP TSG RAN WG1 Meeting #76bis, R1-141359, Shenzhen, China, Mar. 31-Apr. 4, 2014, pp. 1-6.

LG Electronics, "Discussion on Synchronization for D2D Communications," 3GPP TSG RAN WG1 Meeting #75, R1-135488, San Francisco, USA, Nov. 11-15, 2013, pp. 1-7.

LG Electronics, "On the Design of D2DSS and PD2DSCH," 3GPP TSG RAN WG1 Meeting #76, R1-140839, Prague, Czech, Feb. 10-14, 2014, pp. 1-8 (Total 9 pages).

Alcatel-Lucent Shanghai Bell et al., "D2D transmission timing," 3GPP TSG RAN WG1 Meeting #76, R1-140177, Prague, Czech Republic, Feb. 10-14, 2014, 5 pages.

Ericsson, "On Procedures for In/Out of NW coverage detection for D2D," 3GPP TSG RAN WG1 Meeting #76, R1-140780, Prague, CZ Rep., Feb. 10-14, 2013, 5 pages.

ETRI, "D2D Synchronization Signals," 3GPP TSG-RAN1 Meeting #76, R1-140216, Prague, Czech Republic, Feb. 10-14, 2014, pp. 1-7.

Huawei et al., "System Considerations for D2D Synchronization," 3GPP TSG RAN WG1 Meeting #76, R1-140050, Prague, Czech Republic, Feb. 10-14, 2014, pp. 1-5.

ITRI, "D2D Timing Selection and Timing Forward," 3GPP TSG RAN WG1 Meeting #76, R1-140404, Prague, Czech Republic, Feb. 10-14, 2014, 3 pages.

3GPP, "3rd Generation Partnership Project; Technical Specification Group Radio Access Network; Study on LTE Device to Device Proximity Services; Radio Aspects (Release 12)" 3GPP TR 36.843, V1.0.1, Jan. 2014, pp. 1-35.

* cited by examiner

FIG. 8
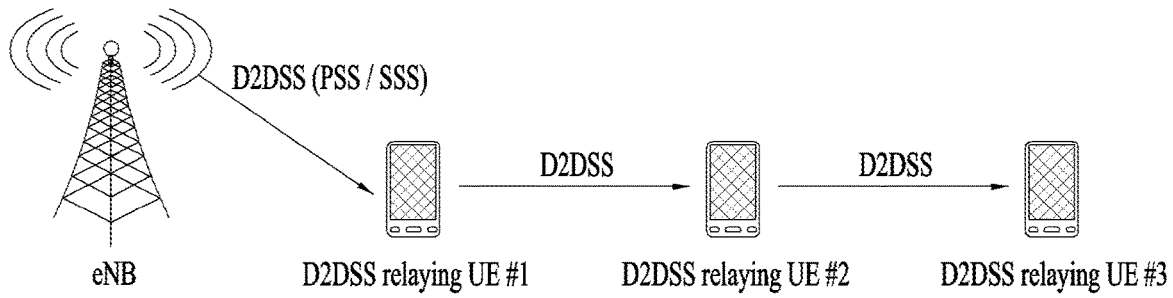
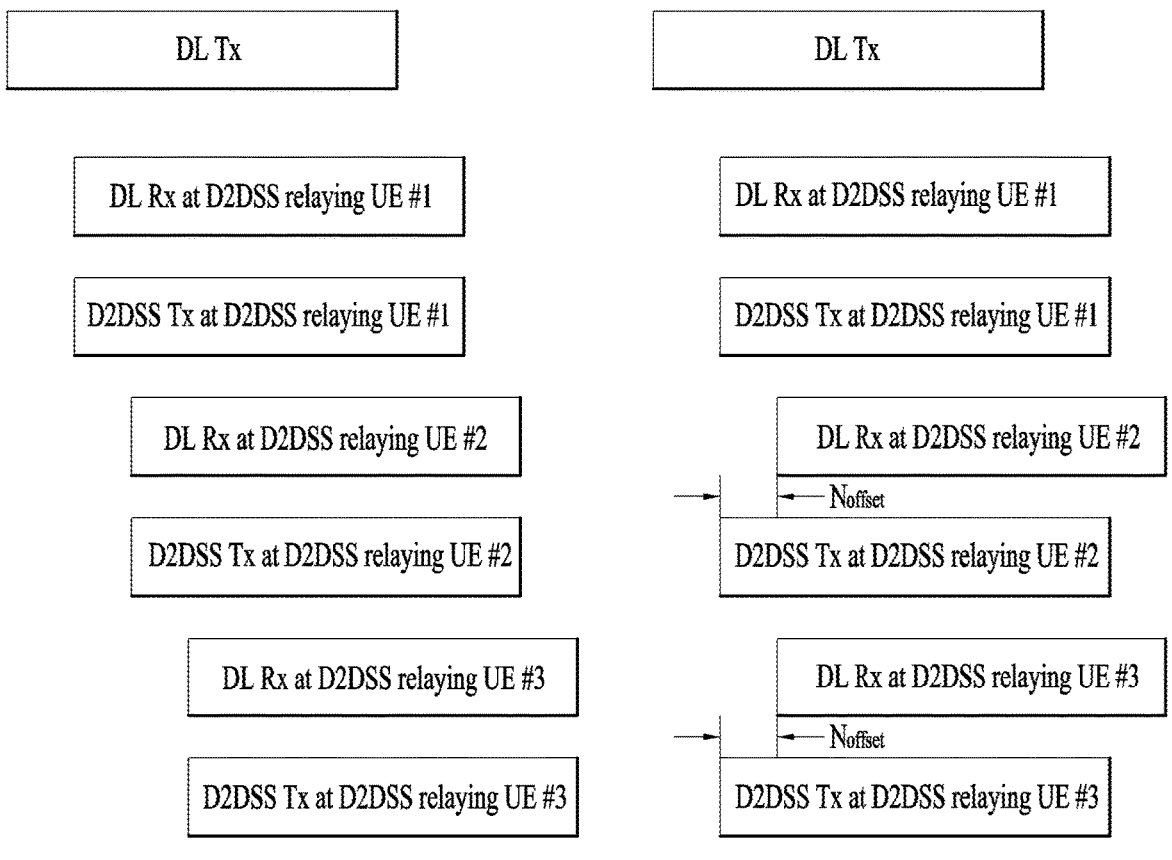
<Case in which offset is not applied during D2DSS transmission>
<Case in which offset is applied during D2DSS transmission>

METHOD AND APPARATUS FOR DEVICE-TO-DEVICE USER EQUIPMENT TO TRANSMIT SIGNAL IN WIRELESS COMMUNICATION SYSTEM

CROSS REFERENCE TO RELATED APPLICATIONS

This application is the National Phase of PCT International Application No. PCT/KR2015/002476, filed on Mar. 13, 2015, which claims priority under 35 U.S.C. 119(e) to U.S. Provisional Application No. 61/952,137, filed on Mar. 13, 2014 and 62/108,501 filed on Jan. 27, 2015, all of which are hereby expressly incorporated by reference into the present application.

TECHNICAL FIELD

The following description relates to a wireless communication system and, more particularly, to a signal transmission method and apparatus in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will simplify procedures of an evolved Node B (eNB), reduce the power consumption of devices participating in D2D communication, increase data transmission rates, increase the accommodation capability of a network, distribute load, and extend cell coverage.

Disclosure

Technical Problem

An object of the present invention is to define whether to apply an offset during D2D signal transmission.

The technical objects that can be achieved through the present invention are not limited to what has been particularly described hereinabove and other technical objects not described herein will be more clearly understood by persons skilled in the art from the following detailed description.

Technical Solution

According to an aspect of the present invention devised to solve the above problems, a method of transmitting a Device-to-Device (D2D) signal by a User Equipment (UE) in a Time Division Duplex (TDD) wireless communication system includes generating a primary synchronization signal and a secondary synchronization signal and transmitting a subframe to which the primary synchronization signal and the secondary synchronization signal are mapped, wherein, if both a cell selection reception level value and a cell selection quality value of the UE are greater than 0, the UE applies a fixed timing advance offset having a value greater than 0, for example, 624 Ts, to transmission of the subframe.

According to another aspect of the present invention, a User Equipment (UE) for transmitting a Device-to-Device (D2D) signal in a Time Division Duplex (TDD) wireless communication system includes a reception module and a processor, wherein the processor is configured to generate a primary synchronization signal and a secondary synchronization signal and transmit a subframe to which the primary synchronization signal and the secondary synchronization signal are mapped and wherein, if both a cell selection reception level value and a cell selection quality value of the UE are greater than 0, the UE applies a fixed timing advance offset having a value greater than 0, for example, 624 Ts, to transmission of the subframe.

If at least one of the cell selection reception level value and the cell selection quality value of the UE is less than 0, the UE may apply a fixed timing advance offset having a value of 0 to transmission of the subframe.

The fixed timing advance offset may be applied in accordance with a downlink radio frame.

The fixed timing advance offset having a value greater than 0 is 624 Ts.

The primary synchronization signal and the secondary synchronization signal may be mapped to a resource on a time domain different from a resource to which a primary synchronization and a secondary synchronization received by the UE are mapped.

The cell selection reception level value may be determined by $$Srxlev = Q_{rxlevmeas} - (Q_{rxlevmin} + Q_{rxlevminoffset}) - Pcompensation - Qoffset_{temp}.$$

where Srxlev is the cell selection reception level value, $Q_{rxlevmeas}$ is a Reference Signal Received Power (RSRP) value, $Q_{rxlevmin}$ is a minimum required reception level in a cell, $Q_{rxlevminoffset}$ is an offset value, Pcompensation is a larger value of a difference between a maximum Tx power value of a UE and a maximum Radio Frequency (RF) output power value and 0, and $Qoffset_{temp}$ is a temporary offset value.

The cell selection quality value may be determined by $$Squal = Q_{qualmeas} - (Q_{qualmin} + Q_{qualminoffset}) - Qoffset_{temp}$$

where Squal is the cell selection quality value, $Q_{qualmeas}$ is a Reference Signal Received Quality (RSRQ) value, $Q_{qualmin}$ is a minimum required quality level in a cell, $Q_{qualminoffset}$ is an offset value, and $Qoffset_{temp}$ is a temporary offset value.

If the UE is out of coverage, the UE may recognize that a duplex mode is TDD by a format of a D2D synchronization signal.

If the UE is out of coverage, the UE may recognize that a duplex mode is TDD through information transmitted together with a D2D synchronization signal.

The size of the fixed timing advance offset may vary with a hop count.

The hop count of 0 may mean synchronization signal transmission by a Base Station (BS).

The hop count may indicate how many times a synchronization signal is relayed from a Base Station (BS).

Advantageous Effects

According to embodiments of the present invention, timing distortion that may be generated during D2D synchronization signal transmission can be reduced.

Effects according to the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

DESCRIPTION OF DRAWING

The accompanying drawings, which are included to provide a further understanding of the invention, illustrate embodiments of the invention and together with the description serve to explain the principle of the invention.

FIG. 7 to FIG. 10 are diagrams illustrating methods of applying an offset to D2D signal transmission according to embodiments of the present invention.

BEST MODE

Figure 1:
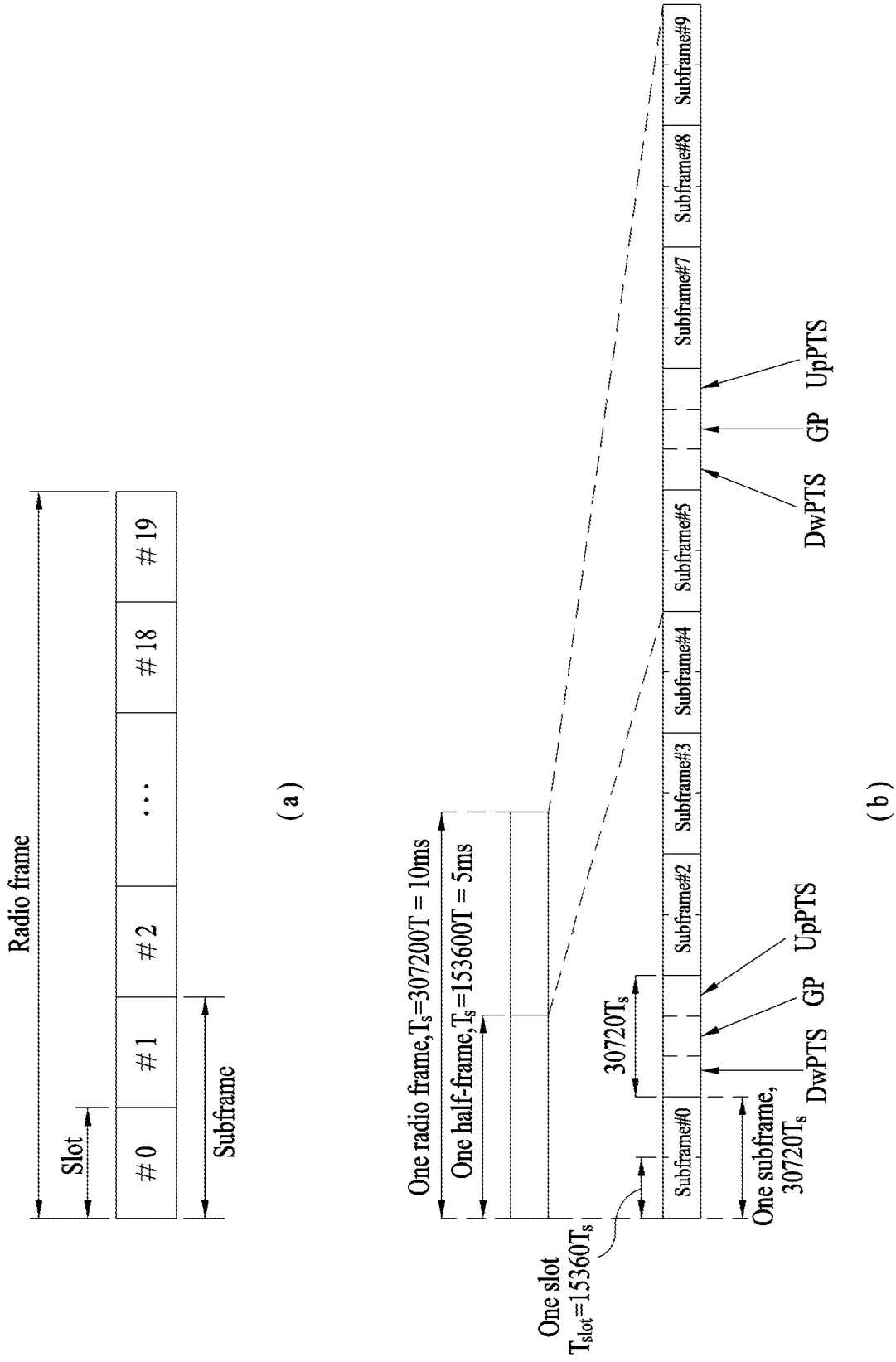
FIG. 1 is a diagram illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A resource structure/channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
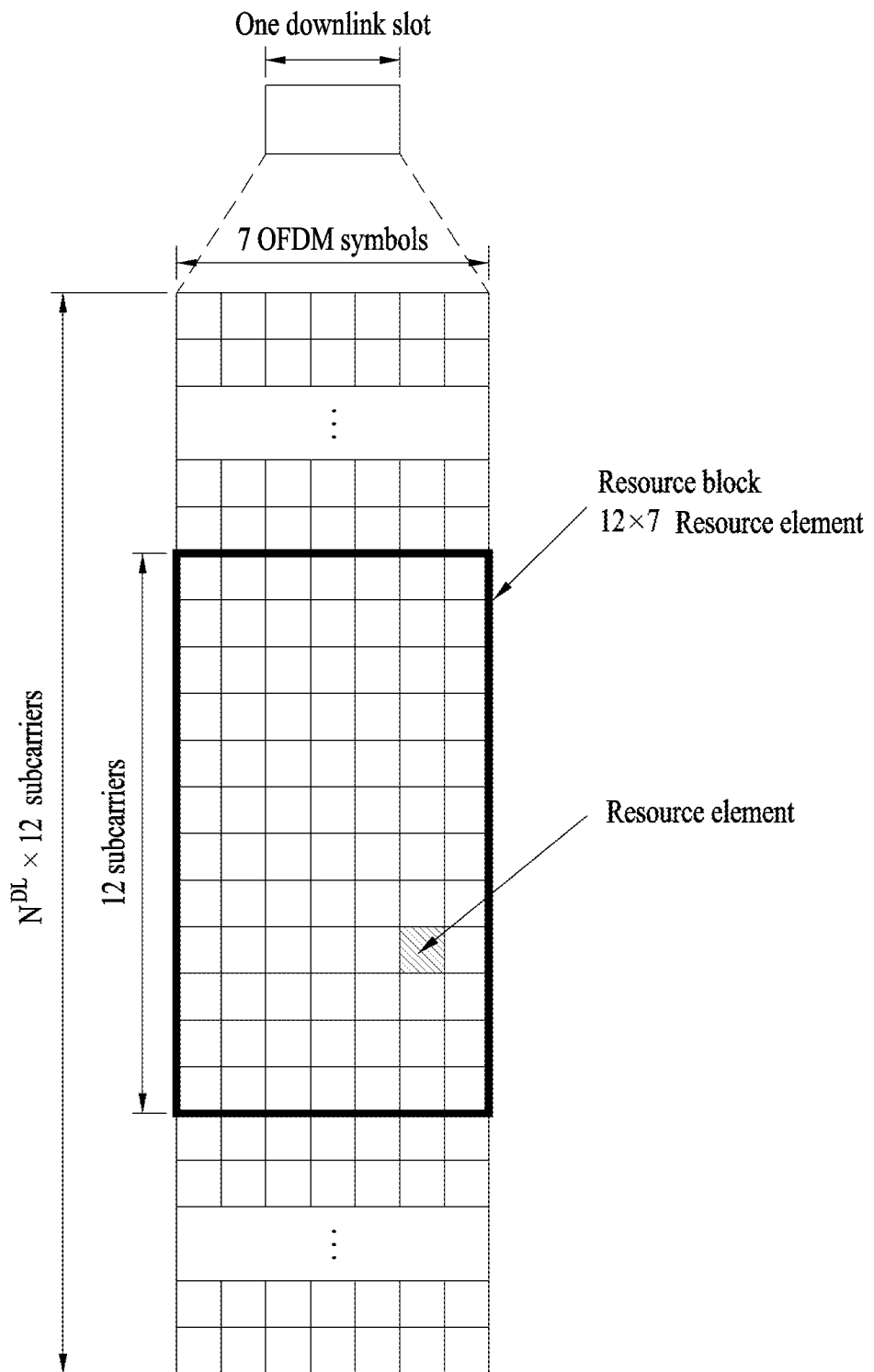
FIG. 2 is a diagram illustrating a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
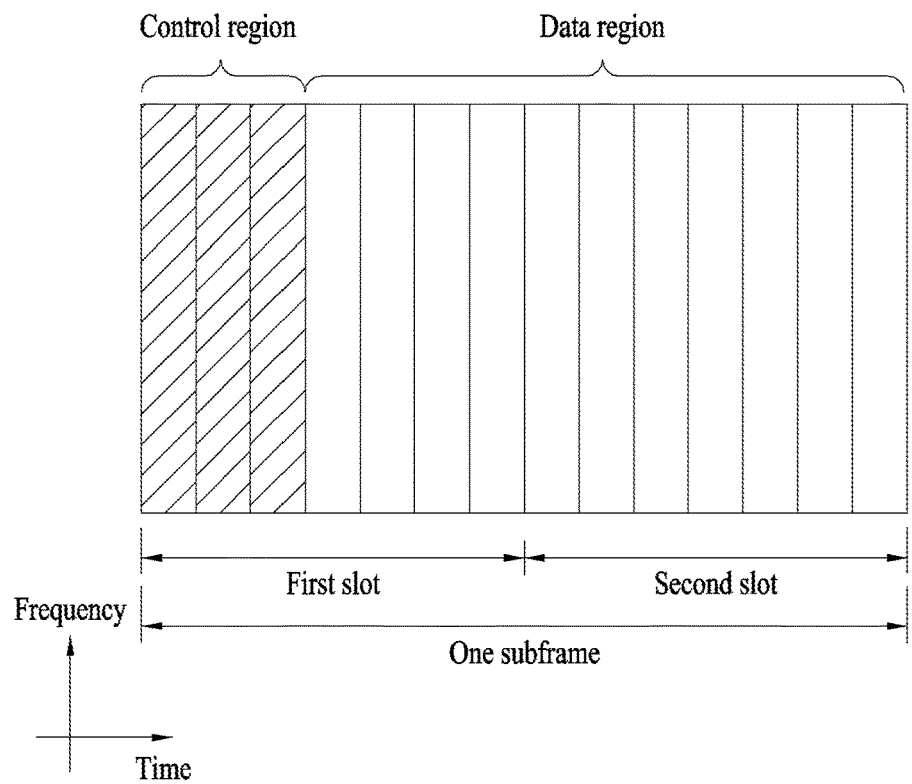
FIG. 3 is a diagram illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
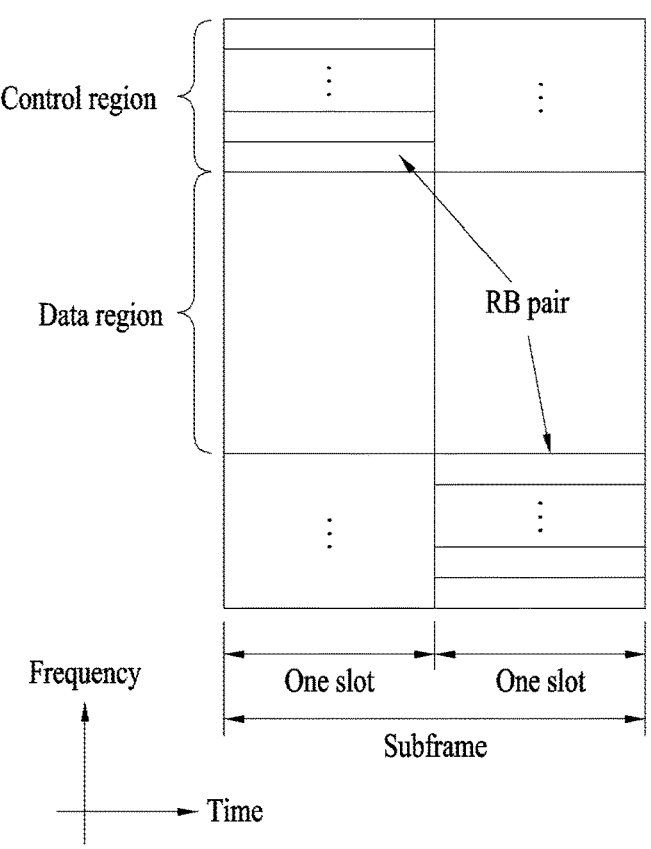
FIG. 4 is a diagram illustrating the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition of D2D UEs

Hereinafter, synchronization acquisition between UEs in D2D communication will be described based on the above description and a legacy LTE/LTE-A system. In an OFDM system, when time/frequency synchronization is not adjusted, it may be impossible to perform multiplexing between different UEs in an OFDM signal due to inter-cell interference. It is inefficient for all UEs to individually adjust synchronization by directly transmitting and receiving a synchronization signal between D2D UEs for the purpose of synchronization adjustment. Therefore, in a distributed node system such as D2D, a specific node may representatively transmit an SS and the other UEs may be synchronized with the synchronization signal. In other words, for D2D signal transmission and reception, some nodes (the nodes in this case may be eNBs, UEs, SRNs (which may be called synchronization reference nodes or synchronization sources) may transmit a D2D Synchronization Signal (D2DSS) and the other nodes may be synchronized with the D2DSS.

The D2DSS may include a Primary D2D Synchronization Signal (PD2DSS) (or a Primary Sidelink Synchronization Signal (PSSS)) and a Secondary D2D Synchronization Signal (SD2DSS) (or a Secondary Sidelink Synchronization Signal (SSSS)). The PD2DSS may have a similar/modified/repeated structure as compared with a predetermined length of a Zadoff-Chu sequence or a Primary Synchronization Signal (PSS). The SD2DSS may have a similar/modified/repeated structure as compared with an M-sequence or a Secondary Synchronization Signal (SSS). If UEs adjust synchronization from an eNB, an SRN becomes the eNB and the D2DSS becomes the PSS/SSS. A Physical D2D Synchronization Channel (PD2DSCH) may be a (broadcast) channel over which basic (system) information that a UE should be aware of first before D2D signal transmission and reception (e.g., D2DSS related information, a Duplex Mode (DM), TDD uplink/downlink configuration, resource pool related information, and a D2DSS related application type) is transmitted. The PD2DSCH may be transmitted in the same subframe as a subframe in which the D2DSS is transmitted or may be transmitted in a subframe after the subframe in which the D2DSS is transmitted.

The SRN may be a node which transmits the D2DSS or the PD2DSCH. The D2DSS may have a specific sequence type and the PD2DSCH may be a sequence indicating specific information or may have a codeword type after predetermined channel coding is performed. In this case, the SRN may be an eNB or a specific D2D UE. In the case of partial network coverage or out-of-network coverage, a UE may become the SRN.

Figure 5:
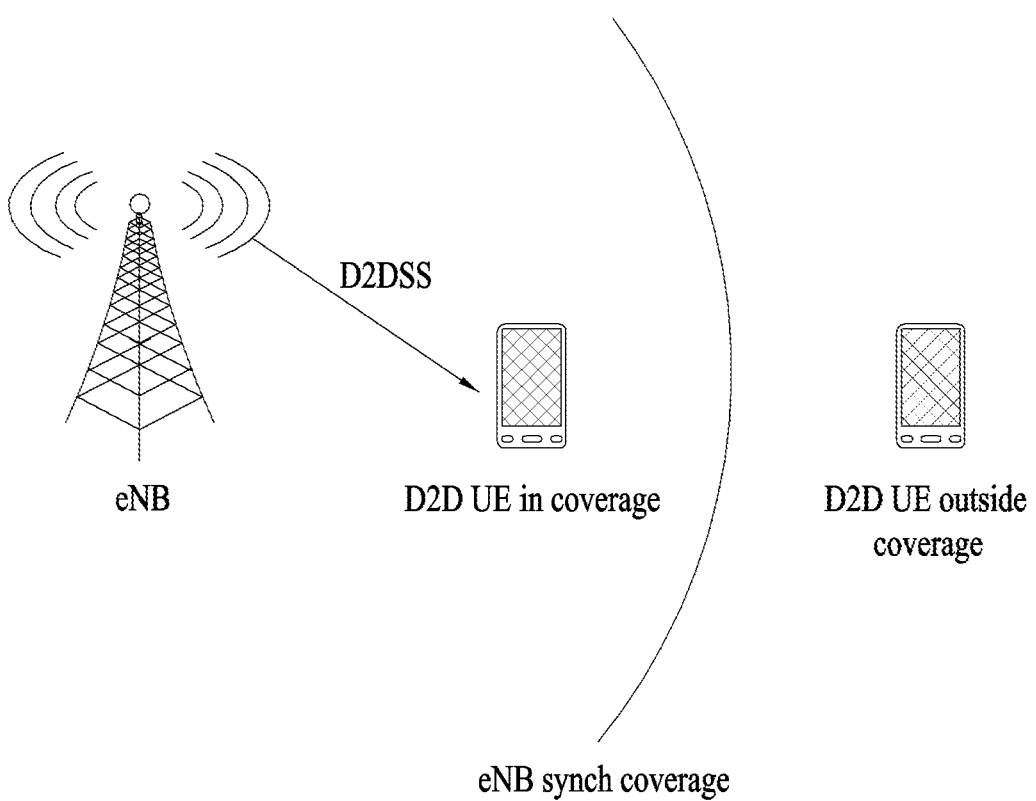
FIG. 5 and FIG. 6 are diagrams illustrating relaying of a synchronization signal.
Figure 6:
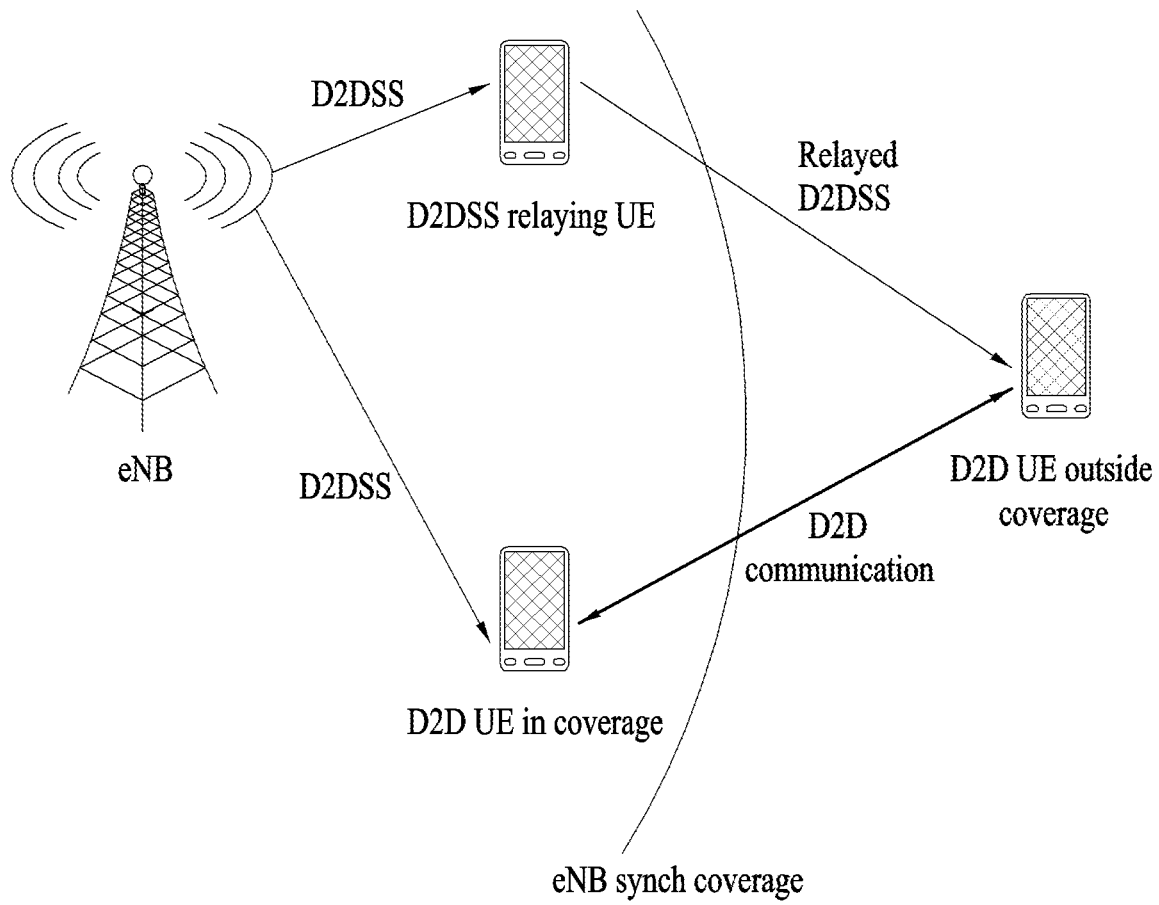

In a situation of FIG. 5, a D2DSS may be relayed for D2D communication with an out-of-coverage UE. The D2DSS may be relayed through multiple hops. In the following description, relaying of a Synchronization Signal (SS) includes the concept of transmission of the D2DSS of an additional format at an SS Rx timing as well as direct Amplify-and-Forward (AF) relaying of the SS of an eNB. In this way, a UE in coverage and a UE out of coverage may perform direct communication through relaying of the D2DSS. FIG. 6 illustrates relaying of the D2DSS and a communication situation between D2D UEs based on relaying of the D2DSS.

Figure 7:
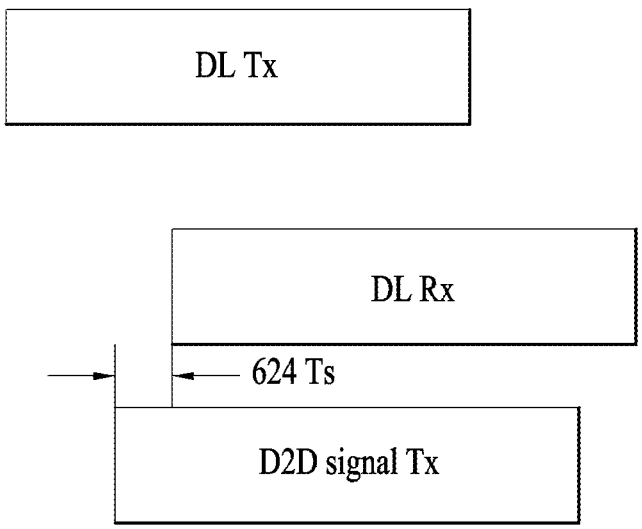

Meanwhile, D2D communication does not necessarily require connection between a network and a UE. Therefore, UEs in an RRC idle state may perform D2D communication. In this case, since the UEs cannot be aware of Timing Advance (TA), the UEs may adjust synchronization at a downlink Rx timing and transmit a D2D signal. Meanwhile, in a legacy TDD system, an uplink signal Tx timing is set to (downlink Rx timing-TA-624 Ts) wherein 624 Ts is to secure a Tx/Rx switching time when a UE receives a signal in a downlink subframe after transmitting a signal in an uplink subframe. That is, an offset corresponding to a Tx/Rx switching period (624 Ts) is applied during uplink signal transmission. In this case, Ts indicates a basic time unit corresponding to $1/(1500*2048)$s. Therefore, as illustrated in FIG. 7, even in D2D communication, if D2D transmission/reception is performed by applying a predetermined length of an offset for the purpose of Tx/Rx switching, there is an advantage in that an additional guard interval is not needed during the next downlink subframe reception. The size of the offset may be 624 Ts.

However, when considering characteristics of D2D communication in which a UE located out of coverage may participate and types of D2D signals, it may be inefficient to equally apply an offset of 624 Ts to all cases. For example, if it is scheduled that a UE out of coverage applies an offset during relaying of a D2DSS, the offset is applied whenever the D2DSS is relayed, thereby greatly distorting synchronization as the number of times of relaying increases.

Accordingly, various embodiments of the present invention regarding applying/using an offset during signal transmission in D2D communication will be described hereinbelow. In the following description, the offset indicates a fixed TA offset and may be 624 Ts, a variable value according to a hop count, a preset value, a value determined by a D2D signal transmission UE according to a monitored D2DSS Rx timing, or a value indicated through a PD2DSCH linked with a pre-received D2DSS.

Embodiment 1

When a UE is located in synchronization coverage of a specific, eNB and transmits a D2DSS, a predetermined offset may be applied to transmission and, when a UE transmits the D2DSS out of synchronization coverage of the specific eNB while relaying the D2DSS starting from the specific eNB or a UE transmits the D2DSS as an independent SRN out of coverage of the specific eNB, an additional offset may not be applied.

In more detail, in a TDD system, a UE may generate a PD2DSS and an SD2DSS and transmit a subframe to which the generated PD2DSS and the SD2DSS are mapped. In this case, when a UE is located in coverage, a fixed TA offset is applied to subframe transmission and, when the UE is out of coverage, the fixed TA offset is not applied to subframe transmission. That is, when both a cell selection received level value Srxlev and a cell selection quality value Squal of the UE are greater than 0 (or satisfy a cell selection criterion S), the UE may apply a fixed TA offset of a value greater than 0 to subframe transmission. If at least one of the cell selection received level value and the cell selection quality value of the UE is less than 0 (or does not satisfy the S criterion), the UE may apply the fixed TA offset having a value of 0 to subframe transmission. In this case, the fixed TA offset may be applied in accordance with a downlink radio frame. If D2DSS generation and transmission of the UE correspond to relaying of an SS, the PD2DSS and the SD2DSS may be transmitted by being mapped to a resource on a time domain different from a resource to which a PD2DSS and an SD2DSS received by the UE are mapped.

In the above description, the cell selection reception level value may be determined by Equation 1:

$$Srxlev = Q_{rxlevmeas} - (Q_{rxlevmin} + Q_{rxlevminoffset}) - Pcompensation - Qoffset_{temp}.$$ [Equation 1]

where Srxlev is the cell selection Rx level value, $Q_{rxlevmeas}$ is a Reference Signal Received Power (RSRP) value, $Q_{rxlevmin}$ is a minimum required Rx level in a cell, $Q_{rxlevminoffset}$ is an offset value, Pcompensation is a larger value of a difference between a maximum Tx power value of a UE and a maximum Radio Frequency (RF) output power value and 0, and $Qoffset_{temp}$ is a temporary offset value. In addition, the cell selection quality value may be determined by Equation 2:

$$Squal = Q_{qualmeas} - (Q_{qualmin} + Q_{qualminoffset}) - Qoffset_{temp}$$ [Equation 2]

where Squal is the cell selection quality value, $Q_{qualmeas}$ is a Reference Signal Received Quality (RSRQ) value, $Q_{qualmin}$ is a minimum required quality level in a cell, $Q_{qualminoffset}$ is an offset value, and $Qoffset_{temp}$. is a temporary offset value. For more details of parameters related to Equation 1 and Equation 2, refer to 3GPP TS 36.304.

The above description may be applied particularly to TDD. An out-of-coverage UE may recognize that a duplex mode is TDD through a format of a D2DSS or information transmitted together with the D2DSS (over a PD2DSCH). Alternatively, if the duplex mode on a specific Component Carrier (CC) is fixed per country, when a UE is powered on in a corresponding country, the UE may be preaware that the corresponding CC is a TDD cell. Upon recognizing that the CC is the TDD cell, the out-of-coverage UE may recognize that a D2DSS is transmitted by the above embodiment and one of embodiments described below and determine whether an offset is applied during D2D signal transmission.

The above-described embodiment has considered the assumption that an offset may need not be applied to the case in which a UE transmitting a D2DSS is out of (direct) synchronization coverage of a specific eNB. In terms of relaying of an SS, if the offset is applied, an effect capable of offsetting a delay caused by propagation delay may be obtained. Notably, relaying of the SS out of coverage may be more frequently generated than relaying of the SS in coverage. If the offset is applied whenever relaying of the SS is performed out of coverage, a Tx timing of the SS may be greatly distorted. In contrast, since UEs in coverage may receive the SS from an eNB, relaying of the SS is less frequently generated and, thus, it may be more proper to apply the offset in consideration of propagation delay. In addition, since UEs in coverage should consider coexistence with cellular downlink and uplink subframes, it is desirable to apply the offset during D2D signal and D2DSS transmission. The above-described embodiment has an effect of reducing timing distortion in SS transmission by considering such a D2D communication environment, particularly, a special situation of relaying of the D2DSS.

As a modification of the above-described embodiment, when a UE synchronized with a D2DSS transmitted by another UE transmits a D2D signal, an offset may not be applied and, when the UE receives a D2DSS which is multi-hop relayed, an offset linked according to a hop count may be applied. In this case, the offset value linked with the hop count may be included in a PD2DSCH or may be a predetermined value according to the hop count (the hop count may be transmitted in the PD2DSCH).

In the above description, the offset may vary with the hop count. In other words, the offset may be applied when a UE transmits the D2DSS in (direct) synchronization coverage of a specific eNB and the offset linked with the hop count may be applied when the hop count increases and the UE is out of synchronization coverage. In this case, the offset value linked with hop count may be included in the PD2DSCH or may be premapped to the hop count. Linkage between the hop count and the offset value may conform to an embodiment described below. If the offset according to the hop count is directly set in the D2DSS, the UE receiving the D2DSS may not apply the additional offset linked to the hop count.

As another example, when a UE in network coverage transmits the D2DSS in frequency bandwidth (e.g., a CC) operating as TDD, 624 Ts from a downlink Rx timing may be applied and, when a UE that transmits a D2D signal in synchronization with a D2DSS transmitted by another UE (in coverage or out of coverage) transmits the D2D signal (including the D2DSS), an offset may not be applied. In other words, the offset may be applied when a UE in coverage transmits the D2DSS and the offset may not be applied irrespective of coverage when a UE synchronized with the D2DSS transmitted by another UE transmits the D2D signal.

In the above description, the linkage between the hop count and the offset may be described by Equation 3 or Equation 4 indicated below. Equation 3 shows a scheme in which an additional offset is set starting from a predetermined number of hops and Equation 4 shows a scheme in which an offset is not applied before a predetermined number of hops and the offset is applied starting from the predetermined number of hops. As mentioned above, Equation 3 and Equation 4 may be applied to embodiments other than Embodiment 1.

$$\text{D2D Tx timing offset}(i) = 624 \text{ Ts} + \max\{0, (i-n) \times \text{Noffset}\}$$ [Equation 3]

In the above equation, i is a hop count and n is a parameter indicating starting from how many hops an additional offset is to be applied and may be predetermined or may be set/configured by a network (n may be indicated by a physical layer or higher layer signal). Noffset is an average offset value per hop and may be predetermined or may be set/configured according to a UE environment. If Noffset can be set/configured, Noffset may be preindicated by a physical layer signal or a higher layer signal of a network or may be indicated by including a D2D signal Tx timing offset or Noffset in a PD2DSCH or a D2D physical layer/higher layer signal. For example, Noffset may be a value determined by an average propagation delay between D2D synchronization UEs. Noffset may be a few microseconds (µs) and may be defined as a fraction of CP length.

$$\text{D2DSS Tx timing offset}(i) = \max\{0, \delta(i-n) \times \text{offset}\}$$ [Equation 4]

In Equation 4, i is a hop count, δ(a) is a function indicating 1 when a is greater than 0, Noffset is an average offset value per hop and may be predetermined or may be set/configured according to a UE environment, and n is a constant indicating up to how many hops transmission without an offset will be performed and may be predetermined or may be set/configured by a network. The network may signal n through a physical layer/higher layer signal. A hop count of 0 indicates that an eNB transmits a PSS/SSS. As a detailed example of using Equation 4, an additional offset may not be applied up to a hop count of 1. An additional offset need not be applied up to the hop count of 1 by an instruction of an eNB in eNB synchronization coverage or because a UE satisfying a specific criterion (signal strength of the eNB in eNB synchronization coverage is above a predetermined threshold) transmits a D2DSS. However, in the case of D2DSS transmission out of coverage, a predetermined offset may be introduced to compensate for a propagation delay according to increase in the number of hops. If Noffset can be set/configured, Noffset may be preindicated by a physical layer/higher layer signal of a network or may be indicated by including a D2DSS Tx timing offset value or Noffset in a PD2DSCH or a D2D physical layer/higher layer signal. For example, Noffset may be a value determined by an average propagation delay between D2D synchronization UEs. Noffset may be a few microseconds (μs) and may be defined as a fraction of CP length. FIG. 8 illustrates the case in which an offset is applied during D2DSS transmission and the case in which the offset is not applied during D2DSS transmission (assumption of n=2), when multi-hop relaying of a D2DSS is applied. In this case, if a propagation delay between D2DSS relaying UEs is similar to Noffset, the UEs transmitting D2DSSs can advantageously transmit the D2DSSs at similar timings. In this case, if the offset according to a hop count is applied to the D2DSS, when a UE synchronized with the D2DSS transmits a D2D signal, an additional offset according to the hop count may not be applied. In this situation, a UE that receives the D2D signal may assume that the D2D signal will arrive at a D2DSS Rx timing.

Embodiment 2

When a UE transmits a D2DSS, an offset may not be applied and, when a UE receiving the D2DSS transmits a D2D signal, the offset may be applied. That is, during D2DSS transmission, an offset of 0 may be applied to a downlink Rx timing. In the case of relaying a multi-hop D2DSS, an offset of 0 may be applied to the D2D Rx timing.

Figure 9:
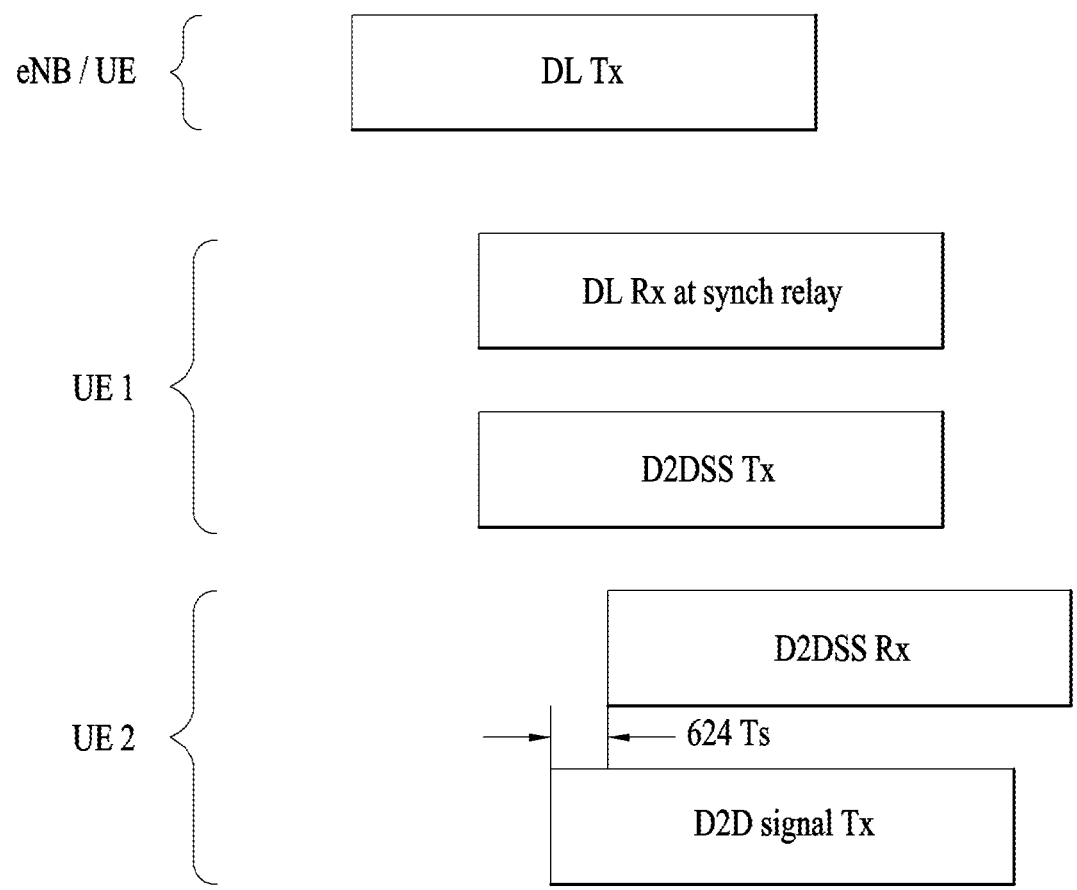

FIG. 9 illustrates the above example. Referring to FIG. 9, UE 1 that receives a downlink signal from an eNB (or a D2D UE) may transmit a D2DSS without applying an offset. UE 2 that receives the D2DSS relayed by UE 1 may transmit a D2D signal by applying an offset (624 Ts) during D2D signal transmission. The size of the offset may be a variable value according to a hop count, a preset value, a value determined by the UE receiving the D2DSS according to a D2DSS Rx timing monitored by the UE transmitting the D2D signal, or a value indicated through a PD2DSCH linked with the D2DSS that has been already received.

Like a timing of the UE that transmits the D2D signal, a timing of a UE that receives the D2D signal needs to be defined. It may be assumed that a timing at which the D2D signal is received may start from a timing at which an offset is applied to a timing at which a specific UE receives the D2DSS.

During relaying of a multi-hop SS, if an SS of an eNB is received with power less than a predetermined threshold when a UE transmitting the D2D signal receives the D2DSS, the UE may perform signal transmission and reception without applying an additional offset during transmission and reception of the D2D signal (except for the D2DSS) as an exceptional case. That is, when a UE becomes out of synchronization coverage of a specific eNB, since signal transmission and reception do not affect uplink of the eNB, an additional offset is not set. Although whether to apply an offset may be set according to a signal Rx power of the eNB, a hop count may be a metric for determining whether to apply the offset. For example, the offset may not be applied or another offset may be applied when a hop count is greater than a predetermined value.

Embodiment 3

Figure 10:
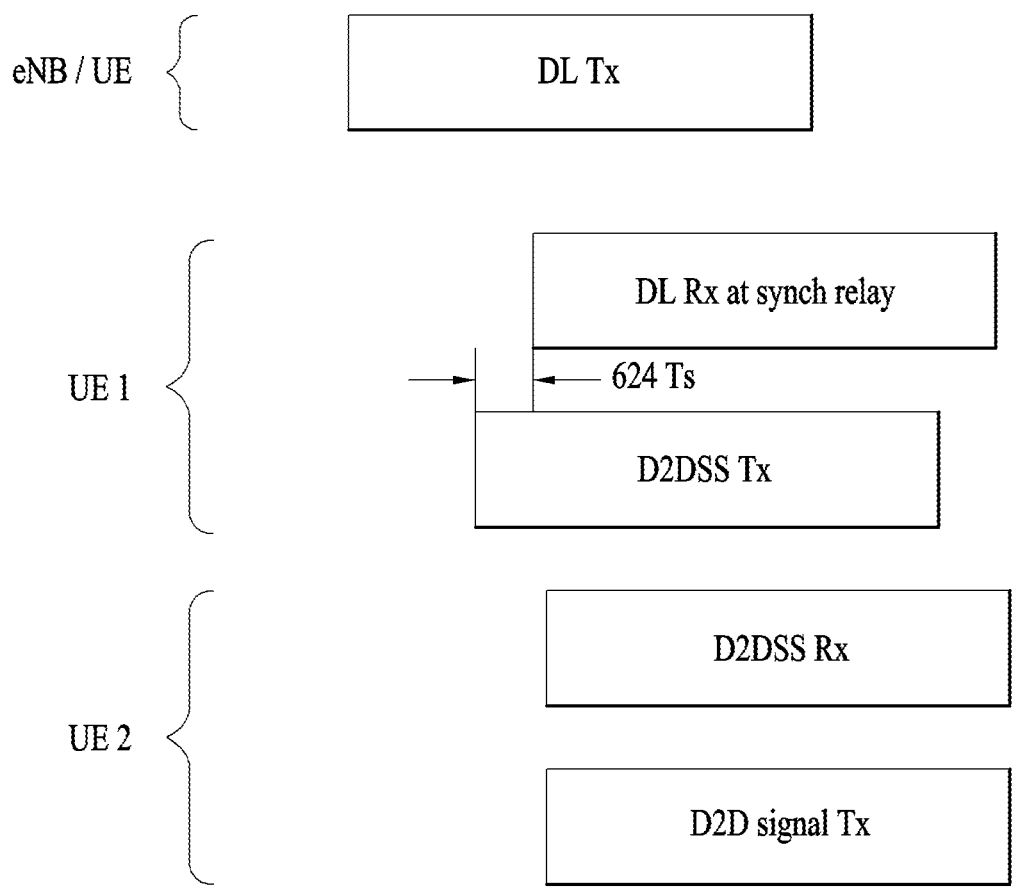

When a UE transmits a D2DSS, an offset may be applied and, when another UE synchronized with the D2DSS transmitted by the UE transmits a D2D signal, the offset may not be applied. When the UE transmitting the D2DSS should receive a downlink signal in the next subframe of a subframe in which the D2DSS is received, a guard interval for Tx/Rx switching is needed. For the guard interval, the UE transmitting the D2DSS may apply the offset and the UE synchronized with the transmitted D2DSS does not apply the offset. FIG. 10 illustrates a scheme of applying an offset of Embodiment 3. As illustrated, when UE1 transmits a D2DSS, an offset is applied and, when UE2 receives the D2DSS to which the offset is applied transmits a D2D signal, the offset is not applied.

Embodiment 4

In a frequency band operating as TDD, a D2D UE may transmit a D2D signal by always applying an offset (624 Ts) from a reference timing. The reference timing may be a PSS/SSS Rx timing from an eNB or a D2DSS Rx timing of another UE. If there is no detected SS (SS having predetermined strength/quality or more), a preset D2D frame number, radio frame, or subframe boundary may be the reference timing.

A UE that has no synchronization source in the vicinity thereof and, therefore, becomes the synchronization source may transmit the D2DSS by applying an offset in accordance with one of the preset D2D frame number, radio frame, and subframe boundary. This method enables the UE to perform transmission by always applying an offset of 624 Ts in a TDD band and to secure a Tx-to-Rx switching interval during a downlink operation or another D2D reception operation after a D2D signal is transmitted. In addition, this method simplifies UE implementation.

Embodiment 5

In a frequency band operating as TDD, a UE that is synchronized with D2DSSue_oon (physical-layer sidelink synchronization identity ∈{168,169, . . . , 335}) (that sets a reference timing of D2D signal transmission to a D2DSS Rx timing) and a UE that transmits an SS due to non-detection of a D2DSS in the vicinity thereof may not apply an offset of 624 Ts. If a cellular network is not detected in the vicinity of the UE, since the UE does not except downlink reception, the offset (624 Ts) is not applied.

Embodiment 6

In a frequency band operating as TDD, a UE synchronized with a D2DSS that corresponds to D2DSSue_net and has a coverage indicator set to 0 in a PD2DSCH (i.e., the case in which a UE transmits D2DSSue_net but is out of coverage) or with D2DSSue_oon or a UE that transmits an SS due to non-detection of a D2DSS in the vicinity thereof may not apply an offset of 624 Ts. In the other cases, the UE may transmit a D2D signal and a D2DSS by applying the offset of 624 Ts.

Construction of Device According to Embodiment of the Present Invention

Figure 11:
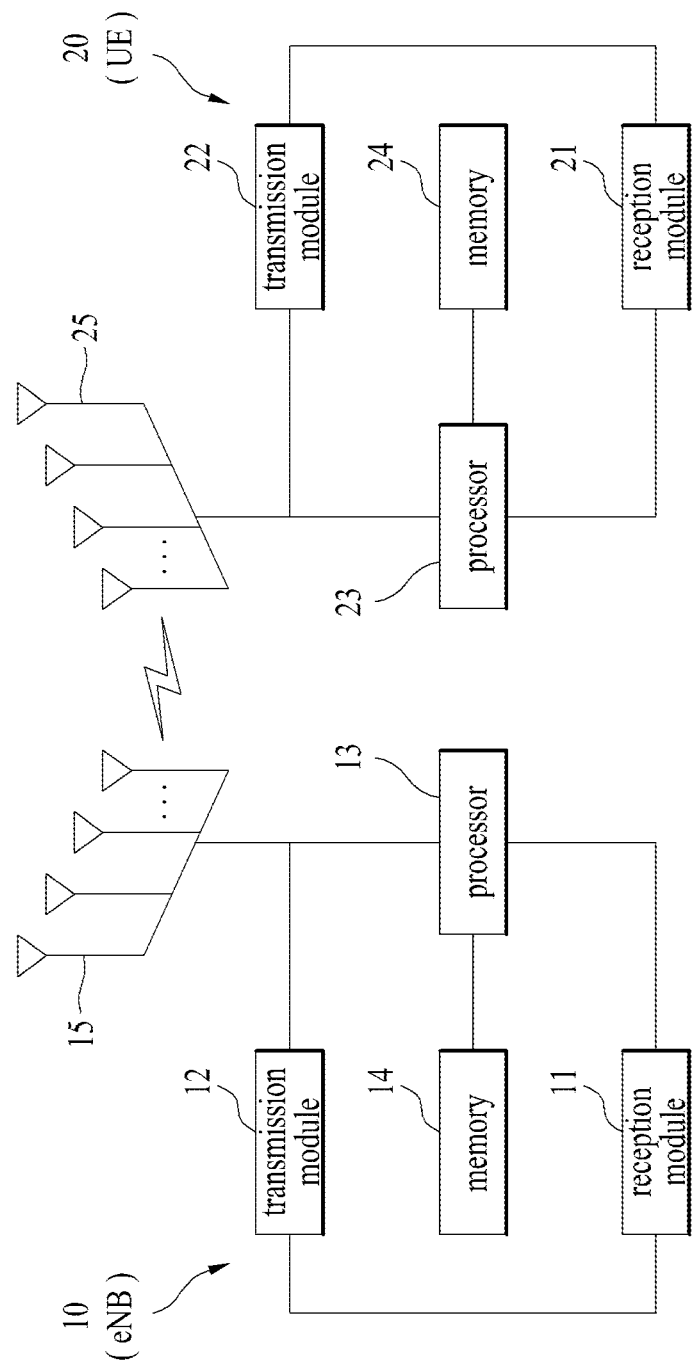
FIG. 11 is a diagram illustrating the construction of transmission and reception apparatuses.

FIG. 11 is a diagram illustrating the construction of a transmission point and a UE according to an embodiment of the present invention.

Referring to FIG. 11, a transmission point 10 according to the present invention may include an Rx module 11, a Tx module 12, a processor 13, a memory 14, and a plurality of antennas 15. The plurality of antennas 15 indicates a transmission point supporting MIMO transmission and reception. The Rx module 11 may receive a variety of signals, data, and information on uplink from the UE. The Tx module 12 may transmit a variety of signals, data, and information on downlink to the UE. The processor 13 may control overall operation of the transmission point apparatus 10.

The processor 13 of the transmission point 10 according to one embodiment of the present invention may operate to perform the above-mentioned embodiments.

The processor 13 of the transmission point apparatus 10 processes information received at the transmission point apparatus 10 and transmission information to be externally transmitted. The memory 14 may store the processed information for a predetermined time. The memory 14 may be replaced with a component such as a buffer (not shown).

Referring to FIG. 11, a UE 20 may include an Rx module 21, a Tx module 22, a processor 23, a memory 24, and a plurality of antennas 25. The plurality of antennas 25 indicates a UE apparatus supporting MIMO transmission and reception. The Rx module 21 may receive downlink signals, data, and information from the eNB. The Tx module 22 may transmit uplink signals, data, and information to the eNB. The processor 23 may control overall operation of the UE apparatus 20.

The processor 23 of the UE apparatus 20 according to one embodiment of the present invention can operate to perform the above-mentioned embodiments.

The processor 23 of the UE 20 processes information received at the UE 20 and transmission information to be externally transmitted. The memory 24 may store the processed information for a predetermined time. The memory 24 may be replaced with a component such as a buffer (not shown).

The detailed configurations of the transmission point apparatus and the UE apparatus may be implemented such that the various embodiments of the present invention are independently performed or two or more embodiments of the present invention are simultaneously performed. Redundant matters will not be described herein for clarity.

The description of the transmission point 10 shown in FIG. 11 may be identically applied to a relay node acting as a downlink transmission entity or uplink reception entity and the description of the UE apparatus 20 may be identically applied to the relay node acting as a downlink reception entity or a uplink transmission entity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

Industrial Applicability

The above-described embodiments of the present invention are applicable to various mobile communication systems.

The invention claimed is:

1. A method of transmitting synchronization signals in a wireless communication system, the method comprising:
    receiving, by a user equipment (UE), a synchronization signal; and
    transmitting, by the UE, a primary synchronization signal (PSS) and a secondary synchronization signal (SSS), based on the received synchronization signal,
    wherein a timing advance offset applied to the transmitting of the PSS and SSS based on the UE being in coverage has a value greater than 0, and
    wherein a timing advance offset applied to the transmitting of the PSS and SSS based on the UE being out of coverage has a value equal to 0 regardless of whether the received synchronization signal is related to in coverage signal or out of coverage signal.

2. The method according to claim 1, wherein the timing advance offset having the value greater than 0 is applied based on a radio frame which is the synchronization signal received through.

3. The method according to claim 1, wherein the timing advance offset having the value greater than 0 is 624 Ts, wherein Ts=1/(15000*2048) seconds.

4. The method according to claim 1, wherein the PSS and the SSS are mapped to a time resource different from a time resource to which a primary synchronization and a secondary synchronization received by the UE are mapped.

5. The method according to claim 1, wherein, if a UE receiving the PSS and the SSS is out of coverage, the UE receiving the PSS and SSS recognizes that a duplex mode is time division duplex (TDD) by a format of the synchronization signals.

6. The method according to claim 1, wherein, if a UE receiving the PSS and the SSS is out of coverage, the UE receiving a subframe including the PSS and the SSS recognizes that a duplex mode is time division duplex (TDD) through information transmitted together with the synchronization signals.

7. The method according to claim 1, wherein the size of the timing advance offset varies with a hop count.

8. The method according to claim 7, wherein a hop count of the UE is greater than 0, and
wherein a hop count of 0 indicates synchronization signal transmission by a base station.

9. The method according to claim 8, wherein the hop count of the UE indicates how many times a synchronization signal is relayed from the base station.

10. The method according to claim 1, wherein the PSS and the SSS are Device-to-Device (D2D) synchronization signals.

11. A user equipment (UE) for transmitting synchronization signals in a wireless communication system, the UE comprising:
a transceiver; and
a processor,
wherein the processor is configured to:
control the transceiver to receive a synchronization signal, and
control the transceiver to transmit a primary synchronization signal (PSS) and a secondary synchronization signal (SSS), based on the received synchronization signal,
wherein a timing advance offset applied to the transmitting of the PSS and SSS based on the UE being in coverage has a value greater than 0, and
wherein a timing advance offset applied to the transmitting of the PSS and SSS based on the UE being out of coverage has a value equal to 0 regardless of whether the received synchronization signal is related to in coverage signal or out of coverage signal.

* * * * *